July 19, 1966 W. R. MECCICO ET AL 3,261,521

GUN RACK

Filed April 23, 1965 2 Sheets-Sheet 1

INVENTOR
WILLIAM R. MECCICO
LARRY K. SHURTLEFF

BY Mason, Mason & Albright
ATTORNEYS

July 19, 1966  W. R. MECCICO ETAL  3,261,521

GUN RACK

Filed April 23, 1965  2 Sheets-Sheet 2

INVENTORS
WILLIAM R. MECCICO
LARRY K. SHURTLEFF

BY *Mason, Mason & Albright*
ATTORNEYS

United States Patent Office 3,261,521
Patented July 19, 1966

3,261,521
GUN RACK
William R. Meccico and Larry K. Shurtleff, both of Star Route, Soda Springs, Idaho
Filed Apr. 23, 1965, Ser. No. 450,593
6 Claims. (Cl. 224—42.44)

This application relates to a gun rack for motor vehicles. More particularly, it relates to a rack for rifles which is secured near the roof of the cab of the vehicle and the windshield and which can conveniently be swung down so that the rifles can be placed into or taken from the rack. The invention is especially well adapted for use in jeep and scout vehicles. It can, however, also be used with advantage in a variety of trucks and station wagons.

A unique aspect of the invention is that it is designed and constructed especially for an overhead position in a vehicle. This position places the guns in a position of maximum safety. It will thus be appreciated that the guns can be removed without being pointed at anyone and that, similarly, when the rack is in the locked upper position, the barrels are not pointed at persons either leaving or entering the vehicle.

The rack is positioned as closely as possible to the roof of the cab where it is not readily visible to persons outside the vehicle. Because of this the rifles are less likely to be exposed to the view of possible thieves than are guns in racks designed to fit on one of the seats of the vehicle. Moreover, with the invention, a locking device is easily adaptable to the structure to give further protection to guns held in the rack.

A further advantage of the invention lies in the circumstance that rifles in the rack are more readily accessible to occupants in the front seat of the vehicle than are rifles carried in most other types of vehicular racks. But at the same time, because of their particular position, they are out of the way when the rack is in a closed position.

It will be appreciated from the disclosure that the rifles are secured not only by the gun clips which are part of the rugged structure of the rack but also in the event that the clips should break for any reason, the rifles are still held by the framework of the rack on one side and the roof of the vehicle on the other.

An advantage of the invention which has been found in practice is that, because of its rigid structure and its particular location, it can serve as a grab bar for persons riding in the front seat of the vehicle in which the rack is mounted.

An important further advantage of the invention lies in its rigid structure which is also relatively inexpensive, and easy to manufacture and install in the vehicle.

Figure 3:
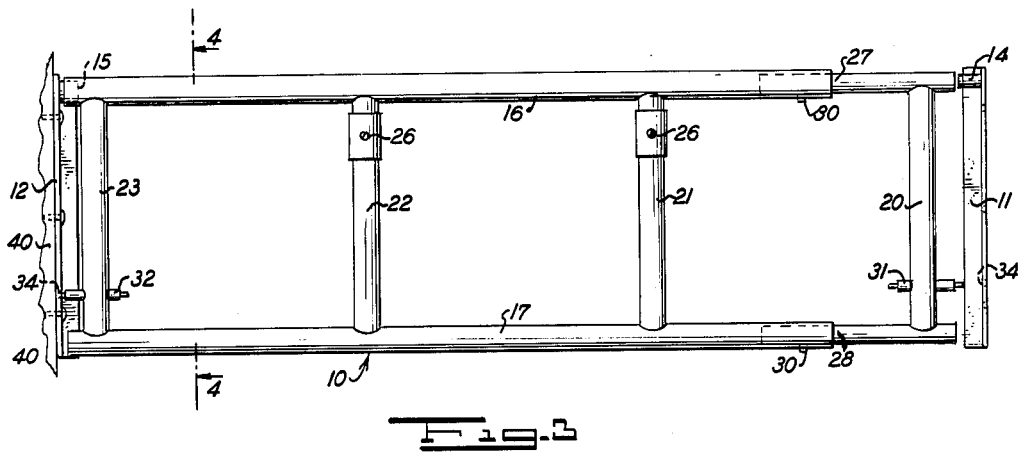
FIGURE 3 is a bottom plan view of the gun rack installed on its left support, the other support being detached.
Figures 4, 5:
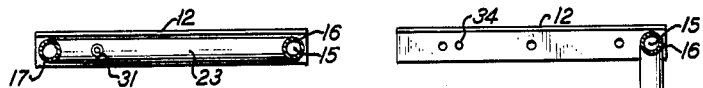
FIGURE 4 is a sectional view taken on line 4—4 of FIGURE 3.
FIGURE 5 is a view similar to FIGURE 4 but with the rack in lowered position.

Having reference now to the drawings, it will be noted from FIGURES 3 and 4 that the rack designated generally 10 comprises a pair of support members 11 and 12 which in this embodiment are made of angle iron and each have hinge means consisting of steel pins 14 and 15 in the forward portions thereof, that is, toward the front of the car. Pins 14 and 15 may be secured to the supports 11 and 12 by welding or any other suitable manner.

Figure 6:
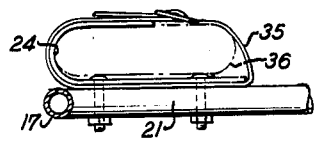
FIGURE 6 is a fragmentary view showing a modified clip structure.

The framework of the rack 10 comprises a pair of tubular bars 16 and 17 which are connected together by four parallel strut members 20, 21, 22 and 23. It will be appreciated that the pins 14 and 15 hingeably carry the opposite ends of the bar 16. The struts 21 and 22 have each secured thereto two pairs of clips 24 and 25. Clips 24 are secured by means such as welding whereas the clips 25 are slideably secured to the struts 21 and 22 by set screws 26. Thus the clips 25 can be adjusted forward and aft along the struts 21 and 22. The bars 16 and 17 are also adjustable and can be elongated telescopically at connections 27 and 28 and rigidly secured at the desired length by set screws 30 or by any other suitable manner as will be understood by any mechanic skilled in the art. The struts 20 and 23 have spring bolts 31 and 32, respectively, near their after ends. An aperture 34 in supports 11 and 12 cooperates with and receives the spring bolt latches 31 and 32. As shown best in FIGURE 6, each of the clips 24 and 25 may have straps 35 connected thereto so that the stocks of the rifles 36 and 37 are completely surrounded by the clips and the straps 35. The clips 24 and 25 are preferably either covered with rubber or plastic coated so that the stocks of the rifles 36 and 37 are not marred.

Figure 1:
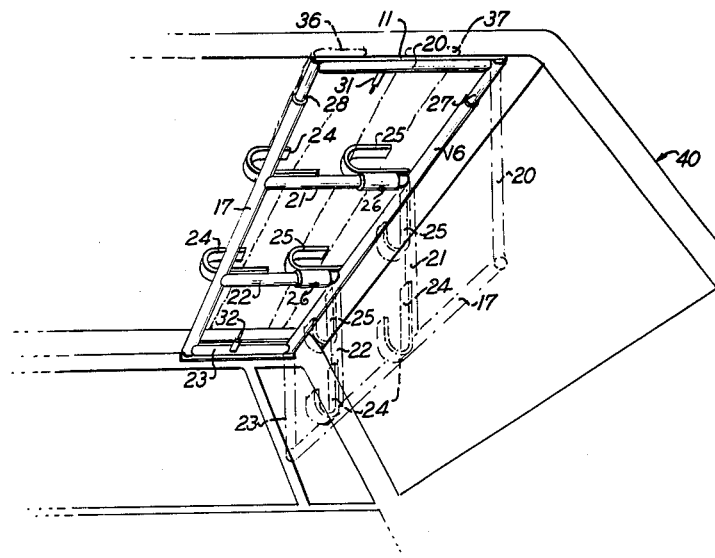
FIGURE 1 is a perspective view showing the rack of the invention installed in the cab of a motor vehicle with a pair of rifles held therein, its lowered position being shown in phantom.
Figure 2:
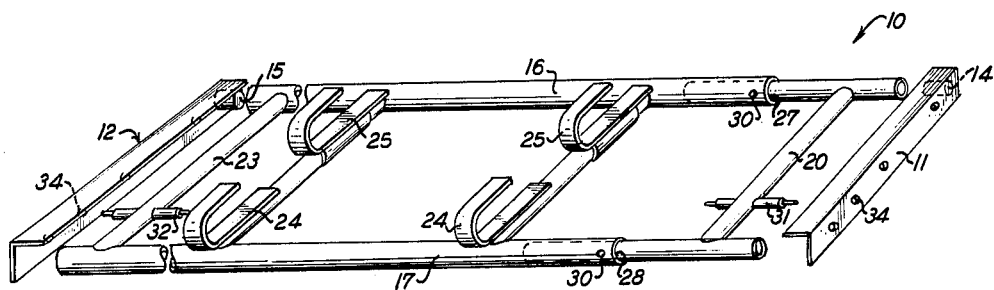
FIGURE 2 is an exploded top perspective view of the gun rack and supports.

As shown in FIGURES 1 and 3, the supports 11 and 12 are bolted to the frame of the vehicle 40 in the forward upper portion near the windshield so that the hinge pins 14 and 15 are adjacent both the roof of the cab of the vehicle and the windshield of the vehicle 40.

Figure 7:
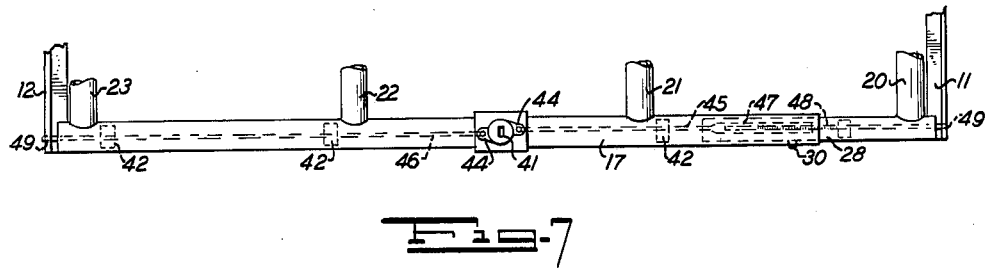
FIGURE 7 is a bottom plan view of the rear portion of the rack showing a locking device which may be used to lock the rack in an upright and closed position.

As shown in FIGURE 7, a lock 41 is provided on the underside of the bar 17. The bar 17 is a hollow tubular structure with a plurality of rubber bushings 42 inserted therein. Extending from a pair of actuating levers 44 operatively connected to and part of the lock 41 are a pair of rod latches 45, 46 which extend through apertures in the bushings 42 to cooperate with further apertures 49 at the forward ends of the supports 11 and 12. Thus when the lock 41 is locked, the framework of the rack 10 is held in place by the latch rods 45 and 46 in the apertures 49, as well as being latched by the spring bolt latches 31 and 32. It will be noted that the rod 46 is extensible in a bushing portion 47 which receives a threaded portion 48 which can be screwed either outwardly or inwardly depending upon the particular elongation of bar 17 at connection 28.

The foregoing detailed description has been given for clearness of understanding only and no unnecessary limitations should be understood therefrom, for further modifications will be obvious to those skilled in the art.

Having described our invention, what we claim as new and desire to secure by Letters Patent of the United States is:

1. In combination with a motor vehicle including a cab, a gun rack which comprises a pair of horizontal supports firmly attached to opposite sides of said cab and adjacent to the roof thereof, a framework, hinge means hingedly connecting said framework to said supports, said framework including a pair of parallel bars, one of said bars extending between said hinge means, said parallel bars connected by at least two struts, gun clips secured to said struts adapted to support a rifle in a horizontal position athwart said vehicle, said framework selectively swingable about said hinge means from a horizontal to a vertically disposed position, and securing means cooperating with said supports and said framework adapted to secure said framework in a horizontal position.

2. In combination with a motor vehicle including a cab, a rack for rifles which comprises a pair of horizontal supports firmly attached to opposite sides of said cab and adjacent to the roof thereof, a framework, hinge means hingedly connecting said framework to said supports, said framework including a pair of parallel bars, one of said bars extending between said hinge means, said bars connected by at least two parallel struts extending normally from said bars, gun clips secured to said struts adapted to support at least two rifles in a generally horizontal position athwart said vehicle, said gun clips including generally U-shaped strap means adapted to surround releasably the stocks of rifles supported in said rack, said framework selectively swingable about said hinge means from a position in a generally horizontal plane to a position in a generally vertically disposed plane, and locking means cooperating with said supports and said framework adapted to lock selectively said framework in its horizontal plane.

3. For combination with a motor vehicle, a rack for rifles which comprises a pair of spaced apart horizontal supports adapted for connection adjacent to the roof of said vehicle, a framework comprising a pair of rigidly connected horizontal bars, a pair of hinge means included in opposite ends of said supports, one of said bars being swingably carried by said hinge means, locking means operatively associated with the other of said bars and said supports whereby said supports and said other bar may be selectively locked together.

4. A rack in accordance with claim 3 including a pair of gun clips, each of said clips being U-shaped and there being strap means connected thereto adapted to close the open end of said clips to surround rifle stocks carried therein.

5. A rack in accordance with claim 3 wherein said other bar is hollow and said locking means comprises a lock extending within said other bar and locking rods within said other bar latchably connecting said support and said lock.

6. A rack in accordance with claim 5 wherein resilient washer means in said other bar are interposed between said other bar and said locking rods.

References Cited by the Examiner

UNITED STATES PATENTS

| | | | |
|---|---|---|---|
| 834,748 | 10/1906 | Nicholson | 211—64 |
| 846,674 | 3/1907 | Lamb | 211—64 |
| 1,459,111 | 6/1923 | McGee. | |
| 2,552,293 | 5/1951 | Page et al. | |
| 2,600,339 | 6/1952 | Stewart | 211—116 |
| 2,797,033 | 6/1957 | Rasbach | 211—64 |
| 2,823,808 | 2/1958 | Hindi | 211—64 |
| 2,929,539 | 3/1960 | Safreno | 224—42.1 |
| 3,167,182 | 1/1965 | Calvin | 224—42.1 |

GERALD M. FORLENZA, *Primary Examiner.*

J. E. OLDS, *Assistant Examiner.*